(12) United States Patent
Ueno et al.

(10) Patent No.: US 8,105,053 B2
(45) Date of Patent: Jan. 31, 2012

(54) TURBOCHARGER

(75) Inventors: Hiroshi Ueno, Tondabayashi (JP);
Toshihiko Shiraki, Yao (JP); Akio Oshima, Nevagawa (JP); Tomonori Nakashita, Suita (JP); Masaaki Ohtsuki, Kashihara (JP); Shigenori Bando, Nara (JP); Masaki Abe, Kashiwara (JP); Ryuji Nakata, Osaka (JP); Takehisa Kida, Kashiba (JP)

(73) Assignee: JTEKT Corporation, Osaka (JP)

( * ) Notice: Subject to any disclaimer, the term of this patent is extended or adjusted under 35 U.S.C. 154(b) by 683 days.

(21) Appl. No.: 12/232,790

(22) Filed: Sep. 24, 2008

(65) Prior Publication Data

US 2009/0081057 A1    Mar. 26, 2009

(30) Foreign Application Priority Data

Sep. 25, 2007   (JP) ................................ P2007-247707

(51) Int. Cl.
*F01P 1/06*    (2006.01)

(52) U.S. Cl. ....................................... 417/366; 417/373

(58) Field of Classification Search .................. 417/366, 417/373; 384/469, 136, 171, 181, 413, 214
See application file for complete search history.

(56) References Cited

U.S. PATENT DOCUMENTS

| | | | | |
|---|---|---|---|---|
| 5,549,449 A | * | 8/1996 | McInerney et al. | 415/177 |
| 2004/0029740 A1 | | 2/2004 | Yatsushiro et al. | |
| 2005/0210875 A1 | * | 9/2005 | Larue et al. | 60/602 |
| 2008/0141921 A1 | * | 6/2008 | Hinderks | 114/274 |

FOREIGN PATENT DOCUMENTS

| | | | |
|---|---|---|---|
| JP | 60-155733 (U) | | 10/1985 |
| JP | 61-226524 | | 10/1986 |
| JP | 5-99231 | | 4/1993 |
| JP | 5-141259 | | 6/1993 |
| JP | 7-208191 | | 8/1995 |
| JP | 10-19045 | | 1/1998 |
| JP | 10231837 A | * | 9/1998 |
| JP | 2000-213550 | | 8/2000 |
| JP | 2003-083342(A) | | 3/2003 |
| JP | 2004-3545 | | 1/2004 |

OTHER PUBLICATIONS

Japanese Office Action dated Sep. 13, 2011 with an English translation thereof.

* cited by examiner

*Primary Examiner* — Peter Macchiarolo
(74) *Attorney, Agent, or Firm* — McGinn IP Law Group, PLLC (57) ABSTRACT

A turbocharger includes a housing, and a turbine shaft supported in a center hole in the housing through rolling bearings. A tank portion for storing lubrication oil is formed in the housing, and the lubricating oil is supplied from the tank portion to the rolling bearings through wick members extending from the tank portion respectively to the rolling bearings. The wick member includes a bundle of fibers made of a plastics material, and a distal end portion thereof is separated into a fibrous condition, and this distal end portion is held in contact with the bearing. The lubricating oil is supplied to the bearing by a capillary action of the wick member.

15 Claims, 8 Drawing Sheets

TURBOCHARGER

BACKGROUND OF THE INVENTION

1. Field of the Invention

This invention relates to a turbocharger.

2. Related Art

Turbochargers have been extensively used in automobiles since they can further enhance the performance of an engine. The turbocharger includes a housing, and a turbine shaft supported in a center hole in the housing through bearings. In such a conventional turbocharger, the bearings are supplied with engine oil to be lubricated. Therefore, many holes serving as passages for engine oil are formed in the small housing of the turbocharger as described in JP-A-5-141259 and JP-A-10-19045.

In the turbochargers described in JP-A-5-141259 and JP-A-10-19045, many holes are formed in a body portion of the housing as described above. Therefore, from the viewpoint of a space, it is difficult to form a coolant passage (for cooling the turbocharger) in the body portion of the small housing, and besides a cooling water jacket can be formed only at part of the body portion. Therefore, there is encountered a problem that a cooling effect by a coolant is low, and therefore the temperature of the bearing becomes high, so that seizure is liable to occur. Furthermore, the amount of oil to be supplied to the bearing is determined by the size (or diameter) of the holes formed in the housing, and therefore there is encountered a problem that the amount of oil to be supplied to the bearing can not be adjusted with the use of these holes.

Furthermore, in the turbochargers described in JP-A-5-141259 and JP-A-10-19045, engine oil contaminated with foreign matters such as carbon sludge produced at the engine is supplied to the bearing. Therefore, particularly when the bearing is a rolling bearing, it is feared that seizure may develop in this rolling bearing when such foreign matters is introduced into the rolling bearing. Therefore, a filter or the like for removing such foreign matters is provided in an intermediate portion of the engine oil passage. Even in this case, the foreign matters can not be completely removed.

SUMMARY OF THE INVENTION

This invention has been made in view of the above problems, and an object of the invention is to provide a turbocharger in which a satisfactory cooling effect is achieved, and also lubricating oil containing no foreign matter is supplied to a rolling bearing, thereby preventing seizure of the rolling bearing.

The above object has been achieved by a turbocharger comprising a housing having a cooling water jacket provided therein, and a turbine shaft supported in a center hole in a center portion of the housing through a rolling bearing, a turbine being mounted on one end portion of the turbine shaft and disposed exteriorly of the housing in an axial direction; characterized in that the turbocharger includes a tank portion which is formed in the housing, and stores lubricating oil for the rolling bearing; and a wick member for supplying the lubricating oil from the tank portion to the rolling bearing by a capillary action, and a distal end portion of the wick member is held in contact with the rolling bearing such that the distal end portion is separated into a plurality of sections.

In this construction, the lubricating oil is supplied from the tank portion formed in the housing, and therefore there is no need to provide any passage for receiving such lubricating oil supplied from the exterior, and as a result the cooling water jacket can be provided in the housing over a wide area from one end portion thereof to the other end portion thereof in the axial direction. The cooling effect is enhanced by this cooling water jacket provided over the wide area, and the rolling bearing can be cooled by this cooling effect. Therefore, seizure of the rolling bearing is suppressed. In addition, the lubricating oil for the rolling bearing is supplied from the tank portion in the housing, and therefore the lubricating oil will not be contaminated with foreign matters produced outside the turbocharger, such as carbon sludge produced in an engine. Thus, foreign matters will not be introduced into the rolling bearing, and therefore seizure of the rolling bearing which would otherwise be caused by such foreign matters can be effectively prevented.

Furthermore, the distal end portion of the wick member is separated into the plurality of sections, and hence has enhanced flexibility, and therefore a pressure of contact between the wick member and the rolling bearing is reduced, so that the resistance to the rotation of the rolling bearing is reduced.

In this turbocharger, preferably, the wick member comprises a bundle of fibers made of a plastics material, and the distal end portion of the wick member is separated into a fibrous condition. With this construction, flexibility of the distal end portion of the wick member is more effectively enhanced, and therefore the contact pressure against the rolling bearing can be further reduced. As a result, the resistance to the rotation of the rolling bearing can be further reduced.

In this turbocharger, preferably, the rolling bearing includes an inner ring having a first raceway formed at an outer periphery thereof, an outer ring having a second raceway formed at an inner periphery thereof, and at least one intermediate ring which is interposed between the inner and outer rings, and has a third raceway formed at an inner periphery thereof and also has a fourth raceway formed at an outer periphery thereof, a row of rolling elements rollably interposed between the third raceway of the intermediate ring and the first raceway of the inner ring, and a row of rolling elements rollably interposed between the fourth raceway of the intermediate ring and the second raceway of the outer ring, and the intermediate ring includes a larger-diameter ring portion, a smaller-diameter ring portion, and an inclined ring portion interconnecting the larger-diameter and smaller-diameter ring portions and disposed in inclined relation to the axial direction, and the distal end portion of the wick member disposed close to the rolling bearing is bifurcated to form two sections, and one of the two sections is held in contact with an inner peripheral surface of the smaller-diameter ring portion, while the other of the two sections is held in contact with an end face of the smaller-diameter ring portion.

In this construction, the distal end portion of the wick member is bifurcated, and therefore flexibility of this distal end portion is enhanced, so that the contact pressure against the rolling bearing can be reduced. The lubricating oil supplied by the capillary action is fed from the distal end of the one section of the bifurcated end portion to the third raceway via the inner peripheral surface of the smaller-diameter ring portion, so that this third raceway, the raceway opposed to the third raceway and the row of rolling elements interposed between the two raceways are lubricated. The lubricating oil is also fed from the distal end of the other section of the bifurcated end portion to the fourth raceway via the end face and outer peripheral surface of the smaller-diameter ring portion, so that this fourth raceway, the raceway opposed to the fourth raceway and the row of rolling elements interposed between the two raceways are lubricated. Thus, the two pairs of opposed raceways of the rolling bearing can be lubricated by one wick member, and therefore the number of wick members used for lubricating the rolling bearing can be reduced.

In this turbocharger, preferably, the wick member includes a core portion, and the core portion includes a fiber portion composed of a large number of fibers made of the plastics material, and interstices existing between the fibers, and a porosity of the core portion which is the ratio of the interstices to a total volume of the core portion is in the range of from 45.5% to less than 80%.

In this construction, the porosity of the wick member is set to the range of from 45.5% to less than 80%, and by doing so, a minimum necessary amount of lubricating oil for preventing seizure can be positively supplied by the capillary action, thus preventing seizure. Here, if the porosity is more than 80%, the volume of the interstices becomes too large, so that the wick member can not retain its shape. In contrast, if the porosity is less than 45.5%, the amount of supply of the lubricating oil becomes too small, so that it is feared that seizure may develop in the rolling bearing.

In the above turbocharger, more preferably, the porosity is set to the range of from 65% to less than 80%. By doing so, a sufficient amount of lubricating oil to prevent seizure can be more stably supplied to the rolling bearing.

In the present invention, the rolling bearing of the turbocharger can be efficiently cooled, and also lubricating oil containing no foreign matter is supplied to the rolling bearing, thereby preventing seizure of the rolling bearing, and further the resistance to the rotation of the rolling bearing can be reduced.

DETAILED DESCRIPTION OF THE PREFERRED EMBODIMENTS

A preferred embodiment of the present invention will now be described with reference to the drawings.

Figure 1:
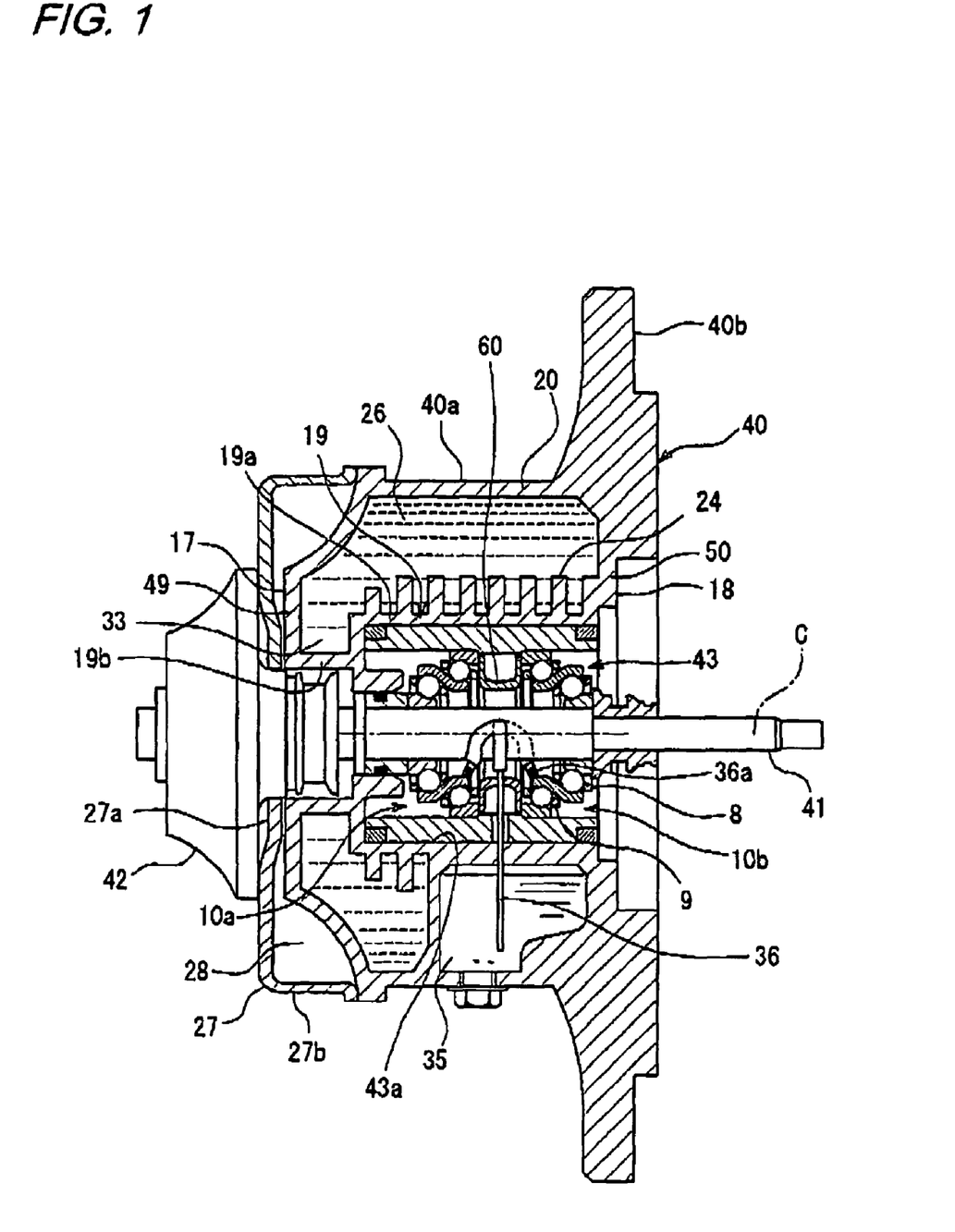
FIG. 1 is a cross-sectional view of one preferred embodiment of a turbocharger of the present invention.

FIG. 1 is a cross-sectional view of one preferred embodiment of a turbocharger of the invention. This turbocharger comprises a housing 40, and a turbine shaft 41 supported in the housing 40 through rolling bearings 10a and 10b. A turbine 42 is mounted on one end portion of the turbine shaft 41, and is disposed exteriorly of the housing 40 in an axial direction, and a compressor (not shown) is mounted on the other end portion of the turbine shaft 41. This turbocharger serves as a turbocharger for an engine of an automobile. The rolling bearings 10a and 10b are spaced from each other in a direction of an axis C, and therefore are arranged in two rows.

The housing 40 includes a body portion 40a having a cylindrical outer periphery, and a flange portion 40b extending radially outwardly from an outer peripheral portion of an end portion 50 of the body portion 40a. The body portion 40a has a center hole 43 formed in a radially-central portion (center portion) thereof, and this center hole 43 is a round hole having its centerline (axis) coinciding with the axis C. The pair of rolling bearings 10a and 10b are provided within the center hole 43. The turbine shaft 41 is supported by these rolling bearings 10a and 10b so as to rotate about the axis C.

The body portion 40a of the housing 40 has a cooling water jacket 26 provided therein. The cooling water jacket 26 is provided within the body portion 40a over a region extending from one axial end portion 49 thereof to the other axial end portion 50 thereof. More specifically, with respect to the axial direction, the cooling water jacket 26 is provided over a range from an inner surface of a side wall 17 at the one end portion 49 of the body portion 40a to an inner surface of a side wall 18 at the other end portion 50, and an axial dimension of the cooling water jacket 26 is larger than that of the center hole 43. With this arrangement, the cooling water jacket 26 extends axially to include regions disposed radially outwardly respectively of the pair of rolling bearings 10a and 10b.

With respect to the circumferential direction of the body portion 40a, the cooling water jacket 26 has an annular portion (extending continuously in the circumferential direction) disposed at the turbine (42) side and surrounding the rolling bearing 10a close to the turbine 42. A tank portion 35 for storing lubricating oil to be supplied to the rolling bearings 10a and 10b is formed in the body portion 40a, that is, at a lower portion (disposed radially outwardly of the other rolling bearing 10b) of that portion of the interior of the body portion 40a disposed at the other end portion (50) side.

Thus, the cooling water jacket 26 encloses the center hole 43 in the axial direction and the radial direction except at the region where the tank portion 35 exists.

The cooling water jacket 26 is formed as a space portion defined by the annular side wall 17 at the one end portion 49 of the body portion 40a, part of the annular side wall 18 at the other end portion 50, an inner peripheral wall 19 forming the center hole 43, and an outer peripheral wall 20 provided at the outer periphery of the body portion 40a. A coolant for cooling purposes exists in this space portion so as to cool the rolling bearings 10a and 10b. A plurality of fins 24 are formed on and project radially outwardly from the inner peripheral wall 19, and enhance the cooling effect for the rolling bearings 10a and 10b. The inner peripheral wall 19 includes a larger-diameter tubular portion 19a defining an outer peripheral surface of the center hole 43, and a smaller-diameter tubular portion 19b (smaller in diameter than the larger-diameter tubular portion 19a) extending from the larger-diameter tubular portion 19a toward the one axial end 49 through a stepped portion.

Further, within the body portion 40a, the cooling water jacket 26 has a portion disposed between the turbine 42 and the rolling bearing 10a. More specifically, the cooling water jacket 26 has the portion disposed at the one end portion (49) side and extending radially inwardly beyond an inner peripheral surface 43a of the center hole 43. This portion is formed as an annular portion 33. An inner peripheral wall of this annular portion 33 is defined by the smaller-diameter tubular portion 19b, and a side wall of the annular portion 33 is defined by an inner peripheral portion of the side wall 17. With this construction, the annular portion 33 is interposed between the turbine 42 and the rolling bearing 10a in the axial direction, and therefore heat from the turbine 42 is efficiently absorbed by the coolant located in the annular portion 33, and particularly a temperature rise of the rolling bearing 10a close to the turbine 42 can be suppressed.

The turbocharger of this embodiment further includes a thermal shield member 27 interposed between the turbine 42 and the housing 40. The thermal shield member 27 is made of a ceramics material or metal, and includes a disc-like portion 27a interposed between the side wall 17 and the turbine 42, and a cylindrical portion 27b extending from the disc-like portion 27a toward the housing 40. The proximal end portion (the turbine shaft 41) of the turbine 42 is passed through a center hole in the disc-like portion 27a, and a close clearance is formed between an inner peripheral edge of this central hole and the outer periphery of the proximal end portion of the turbine 42. A distal end of the cylindrical portion 27b is held in contact with the outer peripheral portion of the body portion 40a of the housing 40. With this arrangement, an annular air chamber 28 is formed between the thermal shield member 27 and the side wall 17 of the housing 40, that is to say, is defined by the disc-like portion 27a, the cylindrical portion 27b and the side wall 17. With this construction, radiation heat and air conduction heat from the turbine 42 are blocked by the thermal shield member 27, and a temperature rise of the housing 40 and the bearings 10a and 10b due to this heat can be suppressed. Further, heat from the turbine 42 is less liable to be transferred to the housing 40 because of the provision of the air chamber 28 between the thermal shield member 27 and the housing 40, so that a temperature rise of the housing 40 and the rolling bearings 10a and 10 can be suppressed.

Next, the rolling bearings 10a and 10b provided in this turbocharger will be described. The pair of rolling bearings 10a and 10b (hereinafter referred to as "rolling bearings 10") have the same construction.

Figure 2:
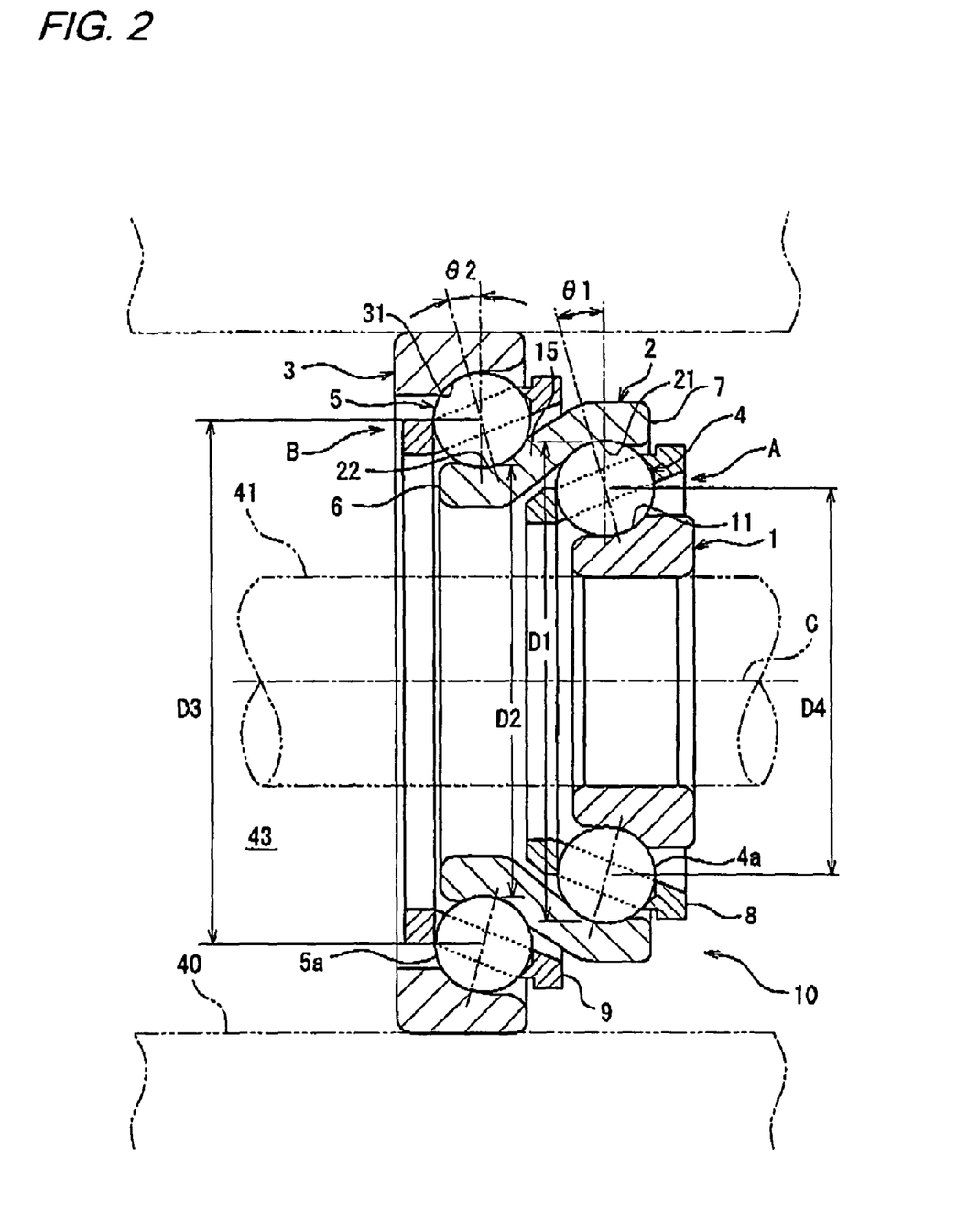
FIG. 2 is a cross-sectional view of a rolling bearing employed in the turbocharger of FIG. 1.

In FIG. 2, this rolling bearing 10 comprises a single inner ring 1 fitted on the turbine shaft 41, a single outer ring 3 fixed to the inner peripheral surface of the center hole 43 of the housing 40, and a single intermediate ring 2 interposed between the inner ring 1 and the outer ring 3. The inner ring 1, the intermediate ring 2 and the outer ring 3 are arranged in this order in the axial direction (the direction of the axis C), and are offset relative to one another in the axial direction. The rolling bearing 10 further includes a row of first rolling elements 4 rollably disposed in an annular space formed between the inner ring 1 and the intermediate ring 2, and a row of second rolling elements 5 rollably disposed in an annular space formed between the intermediate ring 2 and the outer ring 3.

The first rolling elements 4 as well as the second rolling elements 5 comprise a plurality of balls, respectively. The plurality of balls 4a (the first rolling elements 4) are held on a circle (having its center disposed on the axis C) by the cage 8, while the plurality of balls 5a (the second rolling elements 5) are held on a circle (having its center disposed on the axis C) by the cage 9. The balls 4a and 5a have the same diameter.

The inner ring 1 is an annular member, and its inner peripheral surface serves as a fitting surface fitted on the turbine shaft 41, and a first raceway 11 contacting the balls 4a (the first rolling element 4) is formed on an outer peripheral surface of the inner ring 1.

The outer ring 3 is an annular member, and its outer peripheral surface serves as a fitting surface fitted to the inner peripheral surface of the center hole 43 of the housing 40, and a second raceway 31 contacting the balls 5a (the second rolling elements 5) is formed on an inner peripheral surface of the outer ring 3. An axial dimension of the inner ring 1 is generally equal to an axial dimension of the outer ring 3.

The intermediate ring 2 is an annular member, and is larger in axial dimension than the inner ring 1 and the outer ring 3. A third raceway 21 contacting the balls 4a (the first rolling elements 4) is formed on a portion of an inner peripheral surface of the intermediate ring 2, and a fourth raceway 22 contacting the balls 5a (the second rolling elements 5) is formed on a portion of an outer peripheral surface of the intermediate ring 2. The inner ring 1, the intermediate ring 2 and the outer ring 3 having their axes coinciding with the axis C are offset from one another in the direction of the axis C, and are arranged in a concentric manner.

The intermediate ring 2 includes a larger-diameter ring portion 7 of an annular shape, a smaller-diameter ring portion 6 of an annular shape, and an inclined ring portion 15 of an annular shape disposed between and interconnecting the larger-diameter and smaller-diameter ring portions 7 and 6. A diameter of an outer peripheral surface of the smaller-diameter ring portion 6 is smaller than a diameter of an outer peripheral surface of the larger-diameter ring portion 7. The inclined ring portion 15 extends linearly in inclined relation to the axis C. The larger-diameter ring portion 7 is disposed radially outwardly of the inner ring 1 with the row of first rolling elements 4 interposed therebetween. The outer ring 3 is disposed radially outwardly of the smaller-diameter ring portion 6 (which is axially continuous with the larger-diameter ring portion 7 through the inclined ring portion 15) with the row of second rolling elements 5 interposed therebetween. Therefore, the outer ring 3 can be reduced in diameter, and the rolling bearing 10 is formed into the structure in which the radial arrangement projecting much in the radial direction is avoided.

The annular third raceway 21 is formed at a boundary portion between the inner peripheral surface of the larger-diameter ring portion 7 and the inner peripheral surface of the inclined ring portion 15, and the annular fourth raceway 22 is formed at a boundary portion between the outer peripheral surface of the smaller-diameter ring portion 6 and the outer peripheral surface of the inclined ring portion 15. The intermediate ring 2 has a bent shape in its longitudinal cross-section.

A diameter D3 of a pitch circle of the second rolling elements 5 contacting the fourth raceway 22 of the intermediate ring 2 is larger than a diameter D4 of a pitch circle of the first rolling elements 4 contacting the third raceway 21. Therefore, the row of first rolling elements 4 and the row of second rolling elements 5 can be arranged close to each other in the axial direction (the direction of the axis C) with the inclined ring portion 15 interposed therebetween, and the axial dimension of the rolling bearing 10 can be reduced. The diameter of the pitch circle means a diameter of a circle passing through the centers of the row of balls.

Furthermore, the balls 4a (the first rolling elements 4) are disposed in angular contact with the pair of opposed first and third raceways 11 and 21, and the balls 5a (the second rolling elements 5) are disposed in angular contact with the pair of opposed fourth and second raceways 22 and 31. Contact angles θ1 and θ2 for the first and second rolling elements are equal to each other, and for example are 15° in FIG. 2. Therefore, the rolling bearing 10 can receive loads (axial loads) in the direction of the axis C. Furthermore, the rolling bearing 10 is formed into the axial arrangement extending in the direction of the axis C, and therefore has an axial-damper performance.

Furthermore, the intermediate ring 2 is formed into a structure suited for achieving the angular contact of the rolling elements 4 and 5. Namely, the fourth raceway 22 is formed on the outer periphery of the intermediate ring 2 at the boundary portion between the smaller-diameter ring portion 6 and the inclined ring portion 15, and therefore with respect to shoulder portions disposed respectively at opposite sides of the fourth raceway 22, a diameter of the shoulder portion of the inclined ring portion 15 is larger than a diameter of the shoulder portion of the smaller-diameter ring portion 6. Therefore, the fourth raceway 22 can be formed into the angular contact raceway, utilizing the inclination of the inclined ring portion 15. Also, the third raceway 21 is formed at the boundary portion between the larger-diameter ring portion 7 and the inclined ring portion 15, and therefore with respect to shoulder portions disposed respectively at opposite sides of the third raceway 21, a diameter of the shoulder portion of the inclined ring portion 15 is smaller than a diameter of the shoulder portion of the larger-diameter ring portion 7. Therefore, the third raceway 21 can be formed into the angular contact raceway, utilizing the inclination of the inclined ring portion 15.

Thus, the inner ring 1 and the outer ring 3 need to be thickened at their one shoulder portions so that the row of rolling elements 4 and the row of rolling elements 5 can be disposed in angular contact with the inner ring 1 and the outer ring 3, respectively. However, the intermediate ring 2 does not need to be thickened at one shoulder portion (the inclined ring portion 5) so as to achieve the angular contact of the rolling elements 4 and 5. Therefore, the intermediate ring 2 can be simplified in structure, and can be easily produced by plastically deforming a cylindrical member having a peripheral wall with a uniform thickness.

In this intermediate ring 2, the smaller-diameter ring portion 6 is smaller in diameter than the larger-diameter ring portion 7 as described above, and a raceway diameter D2 of the fourth raceway 22 of the smaller-diameter ring portion 6 is smaller than a raceway diameter D1 of the third raceway 21 of the larger-diameter ring portion 7 (D2<D1). The raceway diameter D2 of the fourth raceway 22 is a diameter of the smallest-diameter portion of the raceway 22, and the raceway diameter D1 of the third raceway 21 is a diameter of the largest-diameter portion of the raceway 21.

In the above construction, the row of balls 4*a* (the first rolling elements 4) are rollably interposed between the pair of opposed first and third raceways 11 and 21 of the inner ring and intermediate rings 1 and 2, and the row of balls 5*a* (the second rolling elements 5) are rollably interposed between the pair of opposed second and fourth raceways 22 and 31 of the intermediate and outer rings 2 and 3. This rolling bearing 10 has the plurality of rows (two stages) of rolling elements 4 and 5 disposed between the inner ring 1 (fitted on the turbine shaft 41) and the outer ring 3 fixed to the housing 40. Namely, this rolling bearing 10 comprises a first bearing portion A formed by the inner ring 1, the first rolling elements 4 and the intermediate ring 2 serving as an outer ring, and a second bearing portion B formed by the intermediate ring 2 serving as an inner ring, the second rolling elements 5 and the outer ring 3.

In the rolling bearing 10 of the above construction, when the turbine shaft 41 is rotated at a predetermined number of revolutions, the inner ring 1 of the rolling bearing 10 is rotated at this predetermined number of revolutions relative to the outer ring 3. In this rotating condition, this predetermined number of revolutions is distributed to the first and second bearing portions A and B arranged in the two stages. Namely, although the inner ring 1 rotates together with the turbine shaft 41, the intermediate ring 2 rotates at a speed lower than the speed of rotation of the inner ring 1 (that is, in a decelerated condition) in accordance with the rotation of the inner ring 1. Therefore, the number of revolutions at each bearing portion is smaller than the above predetermined number of revolutions. More specifically, when the turbine shaft 41 is rotated, for example, at 200,000 r.p.m., the first (inner) bearing portion A close to the turbine shaft 41 rotates at 160,000 r.p.m., while the second (outer) bearing portion B close to the housing 40 rotates at 40,000 r.p.m., that is, at a speed lower than that of the first bearing portion A. The rotational speeds distributed respectively to the bearing portions A and B arranged in the plurality of stages are automatically changed in accordance with the rotational speed of the turbine shaft 41 (that is, the rotational speed of the inner ring 1). At this time, the second bearing portion B including the outer ring 3 is rotated at a speed lower than that of the first bearing portion A including the inner ring 1, and the rotational speed is distributed to the bearing portions A and B in a predetermined ratio.

In the intermediate ring 2 of this rolling bearing 10, the fourth raceway 22 is formed on the outer peripheral surface of the boundary portion between the smaller-diameter ring portion 6 (smaller in diameter than the larger-diameter ring portion 7) and the inclined ring portion 15. With this construction, the second rolling elements 5 (contacting the fourth raceway 22 formed at the boundary portion between the smaller-diameter ring portion 6 and the inclined ring portion 5) are disposed at the radially inward position, and therefore the radial dimension of the rolling bearing 10 can be reduced. Namely, the outer diameter of the outer ring 3 can be reduced. Therefore, the inner diameter of the center hole 43 of the housing 40 (in which the rolling bearings 10*a* and 10*b* (see FIG. 1) are fixedly received) can be reduced. As a result, the capacity of the cooling water jacket 26 can be increased.

Figure 3:
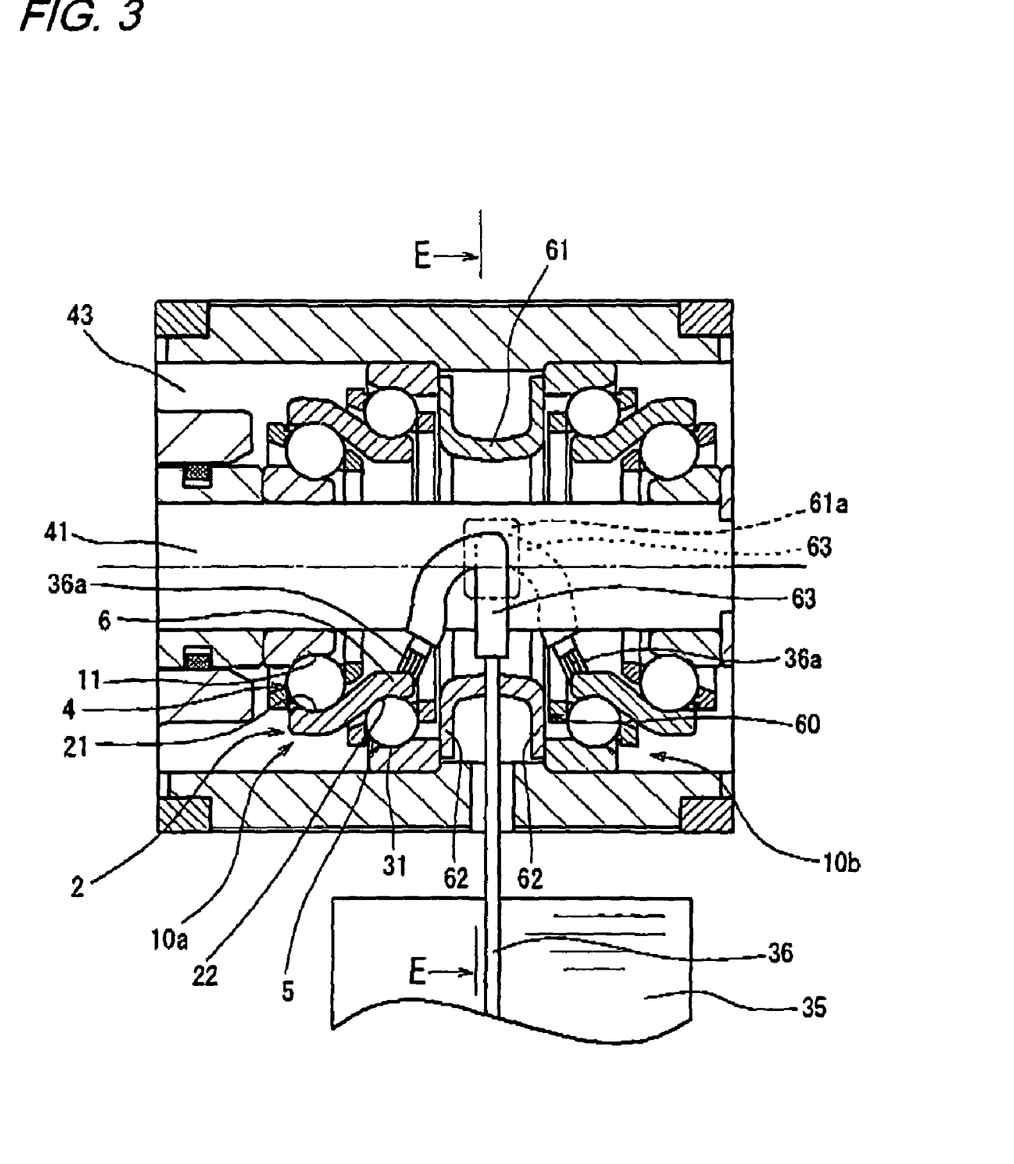
FIG. 3 is a cross-sectional view of an important portion of FIG. 1.

An urging member 60 for applying a preload to the two rolling bearings 10*a* and 10*b* is provided therebetween. FIG. 3 is a transverse cross-sectional view of an important portion of FIG. 1.

The urging member 60 is in the form of a bobbin-like member including a cylindrical portion 61 having the turbine shaft 41 passed therethrough with a clearance, and two flange portions 62 formed respectively on and projecting radially outwardly from opposite ends of the cylindrical portion 61. An annular clearance is formed between the urging member 60 and the inner peripheral surface of the center hole 43. The cylindrical portion 61 has two arcuate through holes 61*a*, and string-like (or cord-like) members 36 (described later) each having a guide tube 63 fitted thereon are passed respectively through these through holes 61*a*. The two through holes 61*a* are disposed out of phase with each other in a direction of the circumference of the cylindrical portion 61 (see FIG. 4). In FIG. 3, one of the through holes 61*a* is shown in a dots-and-dash line, and the showing of the other through hole 61*a* is omitted.

An outer diameter of each flange portion 62 is smaller than the diameter of the center hole 43.

The urging member 60 is interposed between the outer rings 3 of the two rolling bearings 10*a* and 10*b*, with the pair of flange portions 62 elastically deformed toward each other. The outer rings 3 are urged away from each other by the resiliency of the flange portions 62. Therefore, a preload is applied to the rolling bearings 10*a* and 10*b*.

In the turbocharger of this embodiment, lubricating oil for the rolling bearings 10*a* and 10*b* is stored in the tank portion 35 formed in the housing 40, and this lubricating oil is supplied from the tank portion 35 via the two wick members 36 (each extending from the interior of the tank portion 35 to the corresponding rolling bearing 10*a*, 10*b*), that is, by an capillary action of the wick members 36. Namely, the turbocharger of this embodiment has a lubricating structure in which lubricating oil for the rolling bearings 10*a* and 10*b* exists only within the housing 40. In this case, the contamination of lubricating oil with foreign matters such as carbon sludge produced at the engine as in the conventional structure will not occur, and therefore seizure of the rolling bearings 10a and 10b which would otherwise be caused by such foreign matters can be prevented.

The lubricating structure of this embodiment for the rolling bearings 10a and 10b will be described in further detail with reference to FIGS. 3 and 4.

The two guide tubes 63 which guide distal end portions 36a of the two wick members 36 respectively to the rolling bearings 10a and 10b are provided within the center hole 43. These guide tubes 63 pass respectively through the through holes 61a in the cylindrical portion 6, and extend respectively to the rolling bearings 10a and 10b.

Each guide tube 63 passes through the through hole 61a in the cylindrical portion 61 such that its intermediate portion is bent into a generally U-shape within a space formed between the two flange portions 62.

The cylindrical portion 61 has such an inner diameter that the two guide tubes 63 can be laid on the inner peripheral surface of the cylindrical portion 61 in the condition in which the turbine shaft 41 extends through the cylindrical portion 61. The guide tubes 63 are installed so as not to interfere with the turbine shaft 41.

The two wick members 36 are passed respectively through the bores of the two guide tubes 63, and in this condition end portions (proximal end portions) of the wick members 36 remote from the respective guide tubes 63 are immersed in lubricating oil stored in the tank portion 35, while the distal end portions 36a thereof project respectively from distal ends of the guide tubes 63, and are held in contact with the rolling bearings 10a and 10b, respectively. More specifically, the distal end portion 36a of each wick member 36 is held in contact with the inner peripheral surface and end face of the smaller-diameter ring portion 6 of the intermediate ring 2 of the corresponding rolling bearing 10. In this condition, the distal end portion 36a of each wick member 36 is immovably fixed by the guide tube 63. In a portion F of FIG. 4, the outer periphery of the end face of the smaller-diameter ring portion 6 is indicated in a broken line.

The wick member 36 comprises a bundle of fibers (described later) made of a plastics material, and its distal end portion 36a is separated into a fibrous condition, so that this distal end portion 36a is enhanced in flexibility.

Lubricating oil is supplied from the tank portion 35 to each rolling bearing 10a, 10b by a capillary action of the corresponding wick member 36. More specifically, lubricating oil is sucked or drawn up from the tank portion 35 through the wick member 36, and is supplied from the distal end portion 36a thereof into two separate passages, that is, a passage along the inner peripheral surface of the smaller-diameter ring portion 6 and a passage along the end face of the smaller-diameter ring portion 6.

The lubricating oil flowing in the passage along the inner peripheral surface of the smaller-diameter ring portion 6 is supplied from the inner peripheral surface of the smaller-diameter ring portion 6 to the third raceway 21, and is used to lubricate the third raceway 21, the first raceway 11 and the rolling elements 4. On the other hand, the lubricating oil flowing in the passage along the end face of the smaller-diameter ring portion 6 is supplied from the end face of the smaller-diameter ring portion 6 via the outer peripheral surface thereof to the fourth raceway 22, and is used to lubricate the fourth raceway 22, the second raceway 31 and the second rolling elements 5.

The distal end portion 36a of the wick member 36 is disposed at such a position that the amount of lubricating oil to be supplied to the inner peripheral surface of the smaller-diameter ring portion 6 and the amount of lubricating oil to be supplied to the end face of the smaller-diameter ring portion 6 are in a predetermined ratio.

Although not shown in the drawings, the housing has passages for returning the lubricating oil (used in the above lubricating operation) and excess oil from the rolling bearings 10a and 10 to the tank portion 35.

As lubricating oil stored in the tank portion 35, there can be used one which is usually used for lubricating a rolling bearing, and has such a viscosity that it can penetrate into the wick member 36. Among examples of lubricating oil that can be used, preferably, chemical synthetic oil more excellent in anti-seizure property than engine oil, such as polyol ester oil, diester oil, aromatic ester oil, synthetic hydrocarbon oil, ether oil, silicone oil and fluorine oil, is used.

Figure 5:
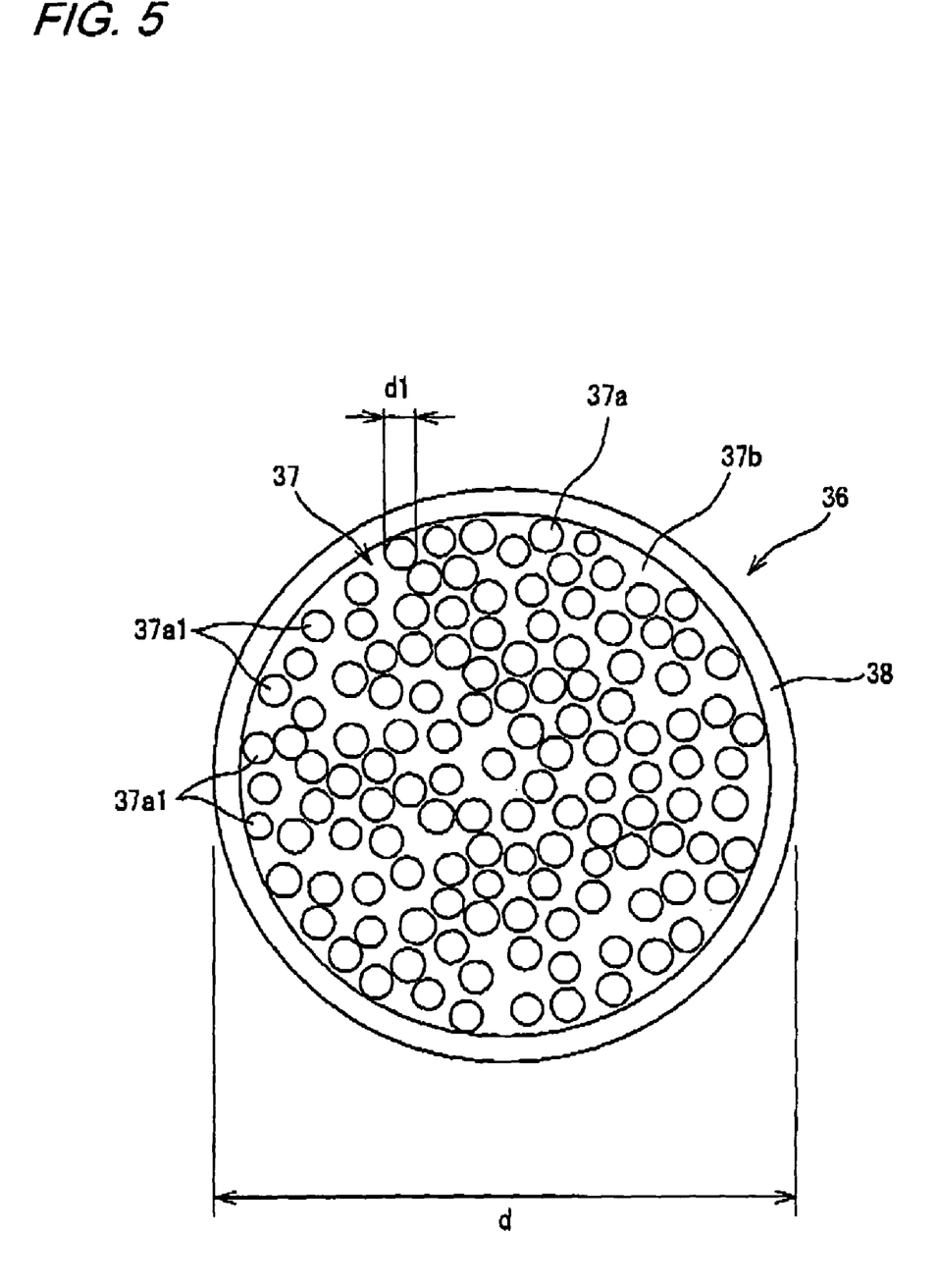
FIG. 5 is a schematic cross-sectional view of a wick member.

FIG. 5 schematically shows a cross-section of the wick member 36. The wick member 37 includes a core portion 37, and a sheath portion (covering portion) 38 covering an outer periphery of this core portion 37, and a diameter (cord diameter) d thereof is 2.1 to 2.3 mm$\phi$. The core portion 37 includes a fiber portion 37a composed of a large number of fibers 37a1 (made of the plastics material), and interstices 37b existing between the fibers 37a1.

The fiber portion 37a can include fibers 37a1 (each having a fiber diameter d1 of 3 to 20 D (denier) (0.014 to 0.090 mm$\phi$)) so that a fiber density of 90 to 1,270 fibers/mm$^2$ can be obtained. Examples of plastics materials used to form the fibers 37a1 include nylon, polyacetal (POM), polyethylene terephthalate (PET) and polyether etherketone (PEEK). Here, fibers made of polyethylene terephthalate (PET) and having a fiber diameter d1 of 5D (denier) (0.023 mm$\phi$) are used, and the cord diameter d is 2.1 mm$\phi$, and the fiber density is 550 fibers/mm$^2$.

The interstices 37b existing in the core portion 37 serve to suck or draw the lubricating oil up (by the capillary action), and by adjusting the ratio (porosity) of the interstices 37b to the total volume of the core portion 37, the amount of supply of the lubricating oil can be changed. In order to supply a minimum necessary amount of lubricating oil for preventing seizure, it is necessary that the porosity should be in the range of from 45.5% to less than 80%, and more preferably in the range of from 65% to less than 80%. Here, the porosity is set to 65.0%.

The sheath portion 38 is made of a binder such as urethane, and the binder located around the outer periphery of the core portion 37 is fused by heat to form the sheath portion 38 covering the core portion 37.

With the use of the above wick members 36, a minimum necessary amount of lubricating oil for preventing seizure can be positively supplied to the rolling bearings by the capillary action without leakage. Therefore, the amount of the lubricating oil to be used can be reduced, and therefore the running cost can be reduced. And besides, a low torque achieved by the reduced amount of lubrication oil improves a fuel consumption of the engine, and further enhances a response of the turbocharger itself, so that a turbo lag is eliminated. Furthermore, lubricating oil is supplied by the capillary action of the wick members, and therefore power is not used for supplying the lubricating oil, and therefore even when the rotation of the turbine shaft 41 is stopped, the lubricating oil can be supplied to the rolling bearings 10 mounted in the center hole 43. Furthermore, the two pairs of opposed raceways of the rolling bearing can be lubricated by the single wick member 36, and therefore the number of the wick members used for lubricating the rolling bearings 10 can be reduced.

In the turbocharger of the above construction, lubricating oil is supplied from the tank portion 35 formed in the housing 40, and therefore there is no need to provide any passage for receiving such lubricating oil supplied from the exterior, and as a result the cooling water jacket 26 can be provided in the body portion 40a of the housing 40 over the wide area from the one end portion 49 thereof to the other end portion 50 thereof. The cooling effect is enhanced by this cooling water jacket 26 provided over the wide area, and the rolling bearings 10a and 10b can be cooled by this cooling effect, so that seizure of the rolling bearings 10a and 10b are suppressed. In addition, the lubricating oil for the rolling bearings 10a and 10b is supplied from the tank portion 35, and therefore foreign matters produced outside the turbocharger will not be introduced into the rolling bearings 10a and 10b. Therefore, seizure of the rolling bearings 10a and 10b which would otherwise be caused by such foreign matters can be effectively prevented.

Furthermore, the distal end portion 36a of each wick member 36 is separated into the fibrous condition, and hence has enhanced flexibility, and therefore a pressure of contact of the wick member 36 with the rolling bearing 10a, 10b is reduced, so that the resistance to the rotation of the rolling bearing 10a, 10b is reduced.

Figure 6:
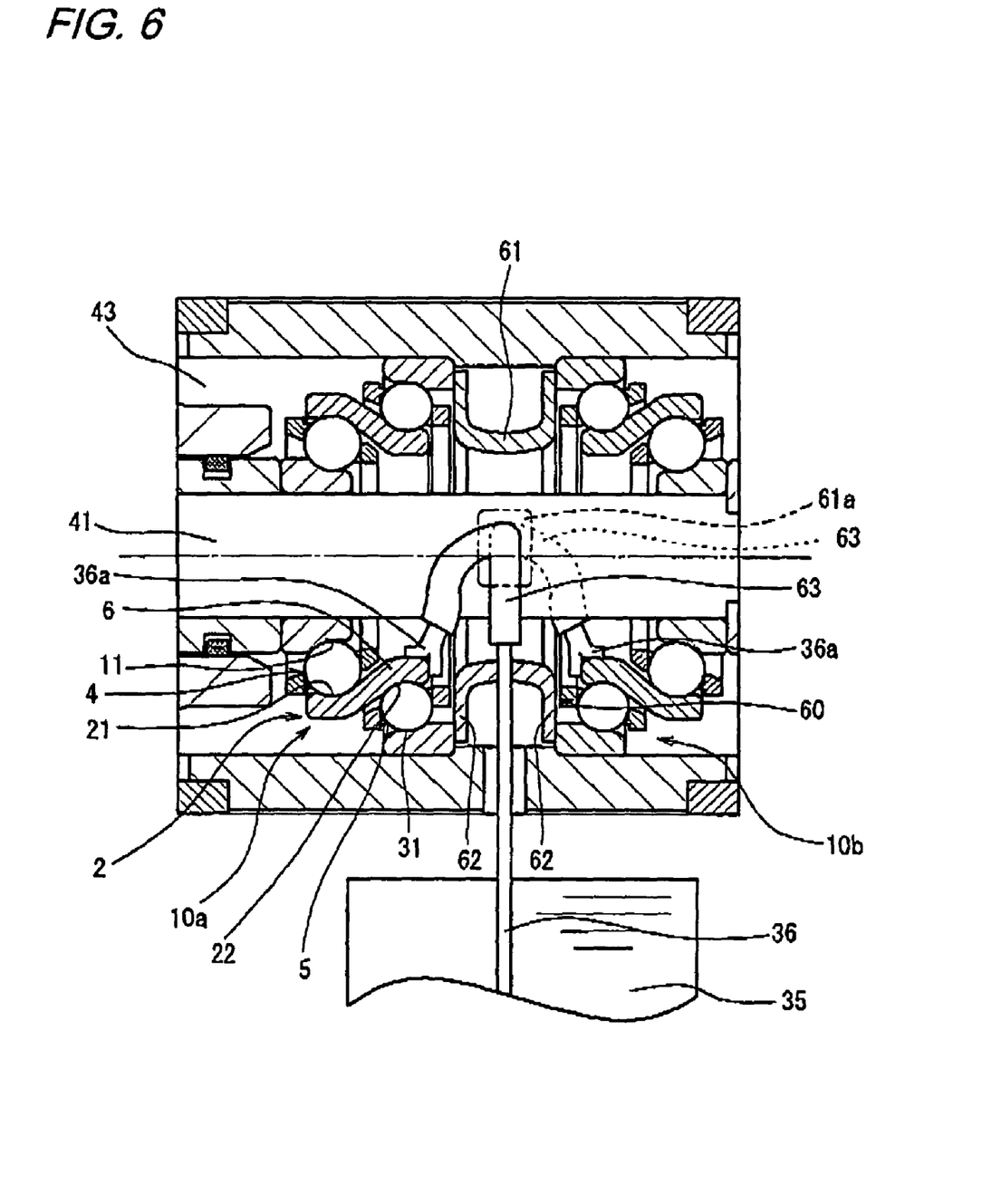
FIG. 6 is a cross-sectional view of another embodiment of a turbocharger of the invention.

FIG. 6 shows another embodiment of the invention in which a distal end portion of each wick member 36 is different in shape from that of the wick member 36 of the above embodiment.

Each wick member 36 shown in FIG. 6 has the distal end portion 36a disposed close to the rolling bearing 10a, 10b and bifurcated (that is, separated into two sections).

Figure 4:
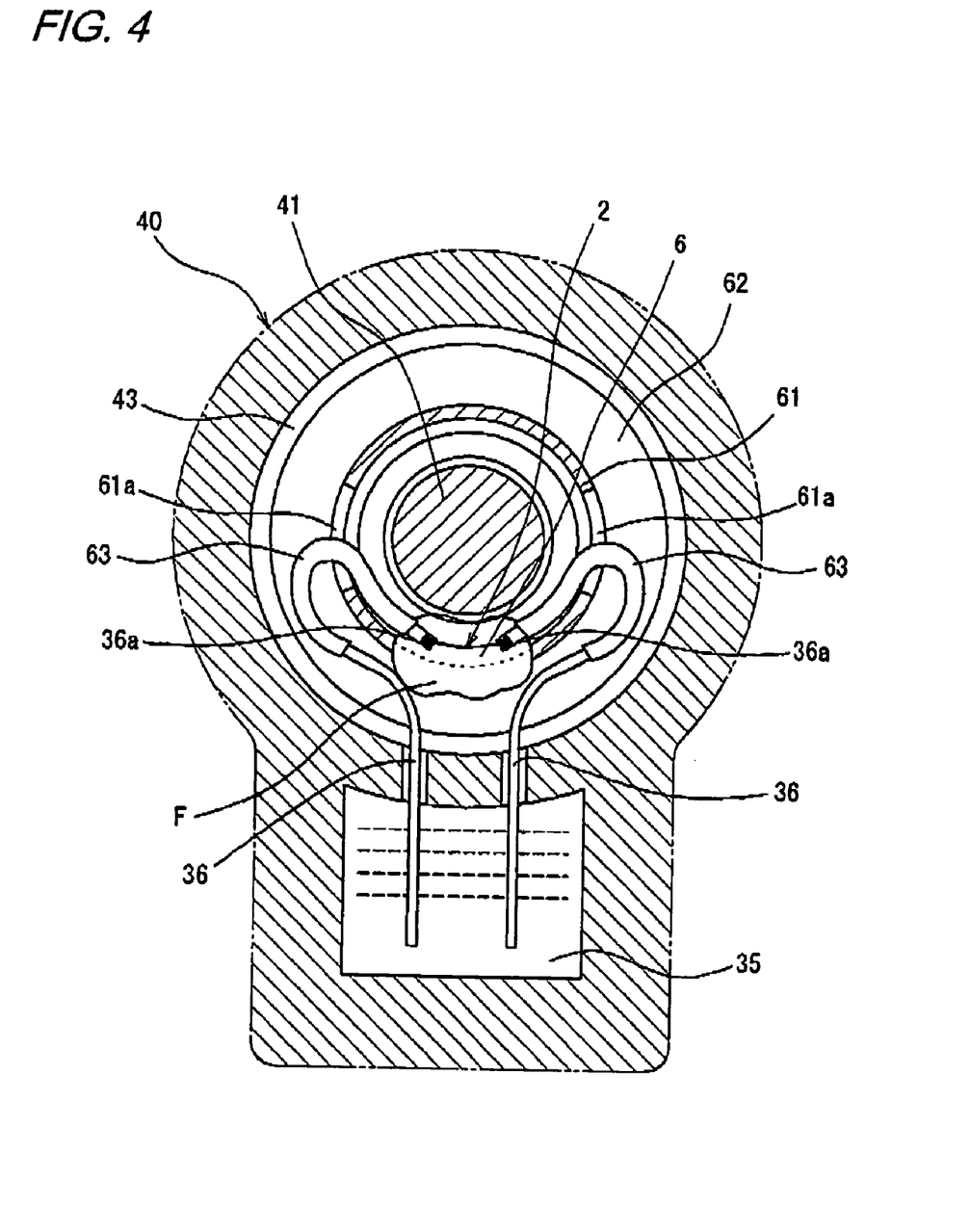
FIG. 4 is a schematic cross-sectional view taken along the line E-E of FIG. 3.

The distal end portion 36a of each wick member 36 shown in FIGS. 3 and 4 is separated into the fibrous condition, and therefore is enhanced in flexibility. On the other hand, the distal end portion 36a of each wick member 36 shown in FIG. 6 is bifurcated, that is, separated into the two sections corresponding to a longitudinal cross-sectional shape of a corner portion defined by the inner peripheral surface and the end face of the smaller-diameter ring portion 6, and therefore this distal end portion 36a is enhanced in flexibility.

In this case, one of the two sections of the bifurcated distal end portion 36a of the wick member 36 is held in contact with the inner peripheral surface of the smaller-diameter ring portion 6, while the other section is held in contact with the end face of the smaller-diameter ring portion 6. With this arrangement, lubricating oil sucked or drawn up from the tank portion 35 by a capillary action of the wick member 36 is supplied from the two sections of the bifurcated distal end portion 36a into two separate passages, that is, from the one section to a passage along the inner peripheral surface of the smaller-diameter ring portion 6 and from the other section to a passage along the end face of the smaller-diameter ring portion 6. The distal end portion 36a of the wick member 36 is thus separated into the bifurcated shape, and therefore the two pairs of opposed raceways of the rolling bearing can be lubricated by one wick member 36, and therefore the number of the wick members used for lubricating the rolling bearings 10 can be reduced.

The other construction is the same as that of the above embodiment of FIGS. 3 and 4, and therefore detailed description thereof will be omitted.

The present invention is not limited to the illustrated embodiments, and suitable modifications can be made within the scope of the invention.

For example, although there are used the two wick members 36 corresponding respectively to the two rolling bearings 10a and 10b, only one wick member 36 may be used, in which case this wick member 36 is bifurcated to provide two portions, and one of the two portions is guided to one rolling bearing 10a, while the other portion is guided to the other rolling bearing 10b.

According to an operating temperature of the turbocharger, any other suitable plastics material than PET can be used as the material for producing the fibers 37a1 of the wick member 36. Furthermore, the porosity, the fiber diameter and the fiber density can be suitably changed. In the above embodiment, although the binder is used to form the sheath portion 38, it is not always necessary to use the binder, and for example, the outer peripheral surface of the bundle of fibers 37a may be fused and then solidified to form a sheath portion 38.

Furthermore, each rolling bearing 10 is not limited to the illustrated type, and may, for example, include two or more intermediate rings. In this case, the rotational speed at each of the bearing portions is further reduced, so that the rolling bearing which can meet a higher-speed operation can be obtained.

Example

1. Seizure Test for Bearings

In order to determine the amount of supply of lubricating oil for avoiding seizure of a bearing, a seizure test of bearings was conducted using aromatic ester oil and currently-used engine oil (Mobil special 10W-30 (tradename) produced by Exxon Mobil), and anti-seizure properties of the two were compared with each other. As the aromatic ester oil, there were used two kinds, that is, Item No. T-45 (hereinafter referred to as "lubricating oil 1") produced by Sato Special Oil Production Kabushiki Kaisha and Item No. T08-NB (hereinafter referred to as "lubricating oil 2") produced by Sato Special Oil Production Kabushiki Kaisha. Values of physical properties of the two lubricating oils are shown in Table 1. The seizure test was conducted under conditions (Bearing Model No. 608; 170° C.×100,000 rpm; 0.01 cc coating) (n=2). Results thereof are shown in FIG. 7.

TABLE 1

|  |  | Lubricating oil 1 | Lubricating oil 2 |
| --- | --- | --- | --- |
| Viscosity | 40° C. | 45.7 | 90.0 |
|  | 100° C. | 7.1 | 9.0 |
| Density (g/cm$^3$) |  | 0.985 | 0.992 |
| Pour point (° C.) |  | −51 | −45 |

Figure 7:
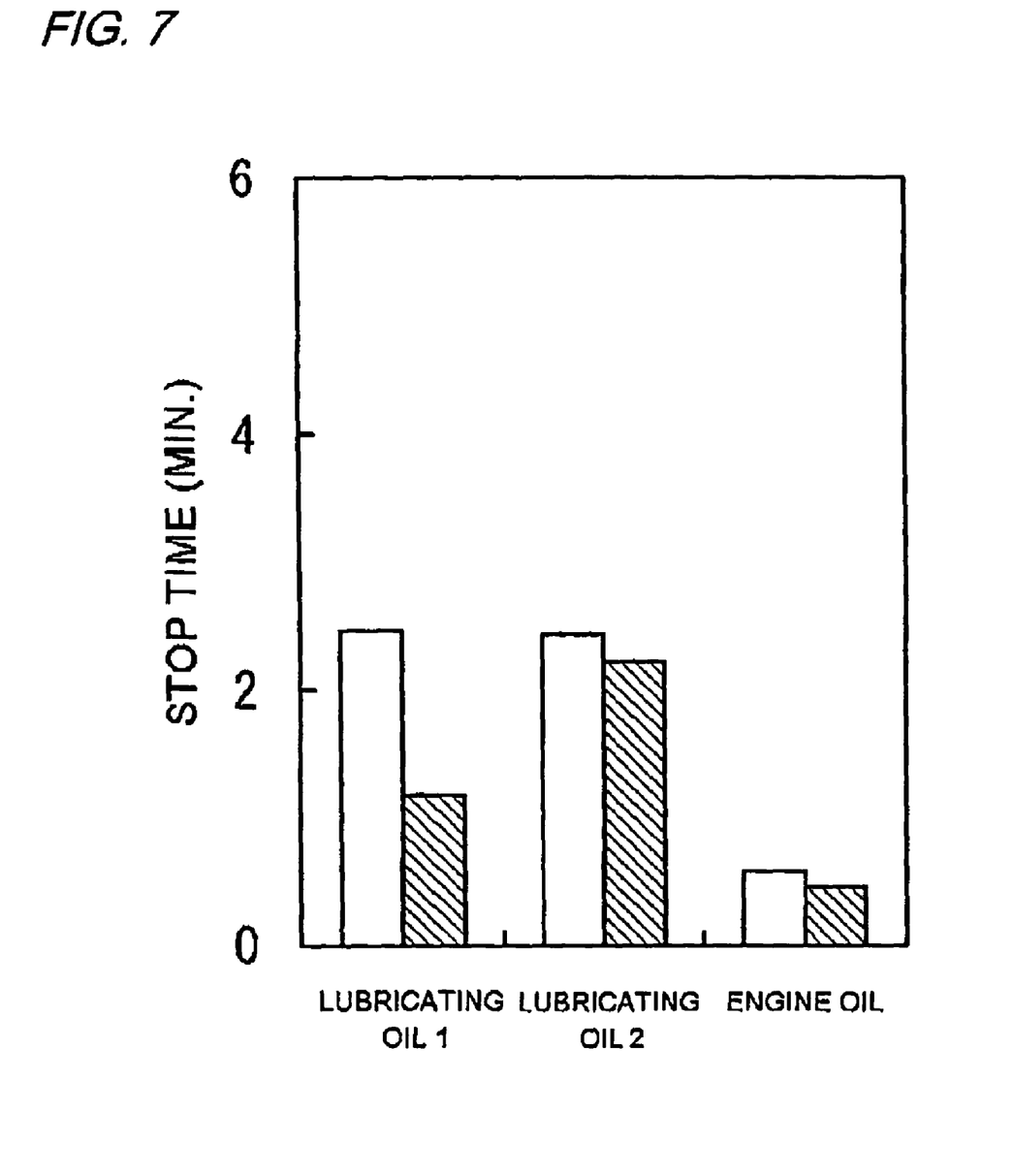
FIG. 7 is a diagram showing results of a seizure test of bearings.

It will be appreciated from FIG. 7 that the aromatic ester oils are about two to four times as excellent in anti-seizure property as the current engine oil. With respect to the aromatic ester oils, a bearing life per 0.01 cc is about 2 minutes, and therefore it will be appreciated that seizure of the bearing can be avoided with a lubricating oil supply amount of about 0.005 cc/minute.

2. Suction Test of Wick Members

Figure 8:
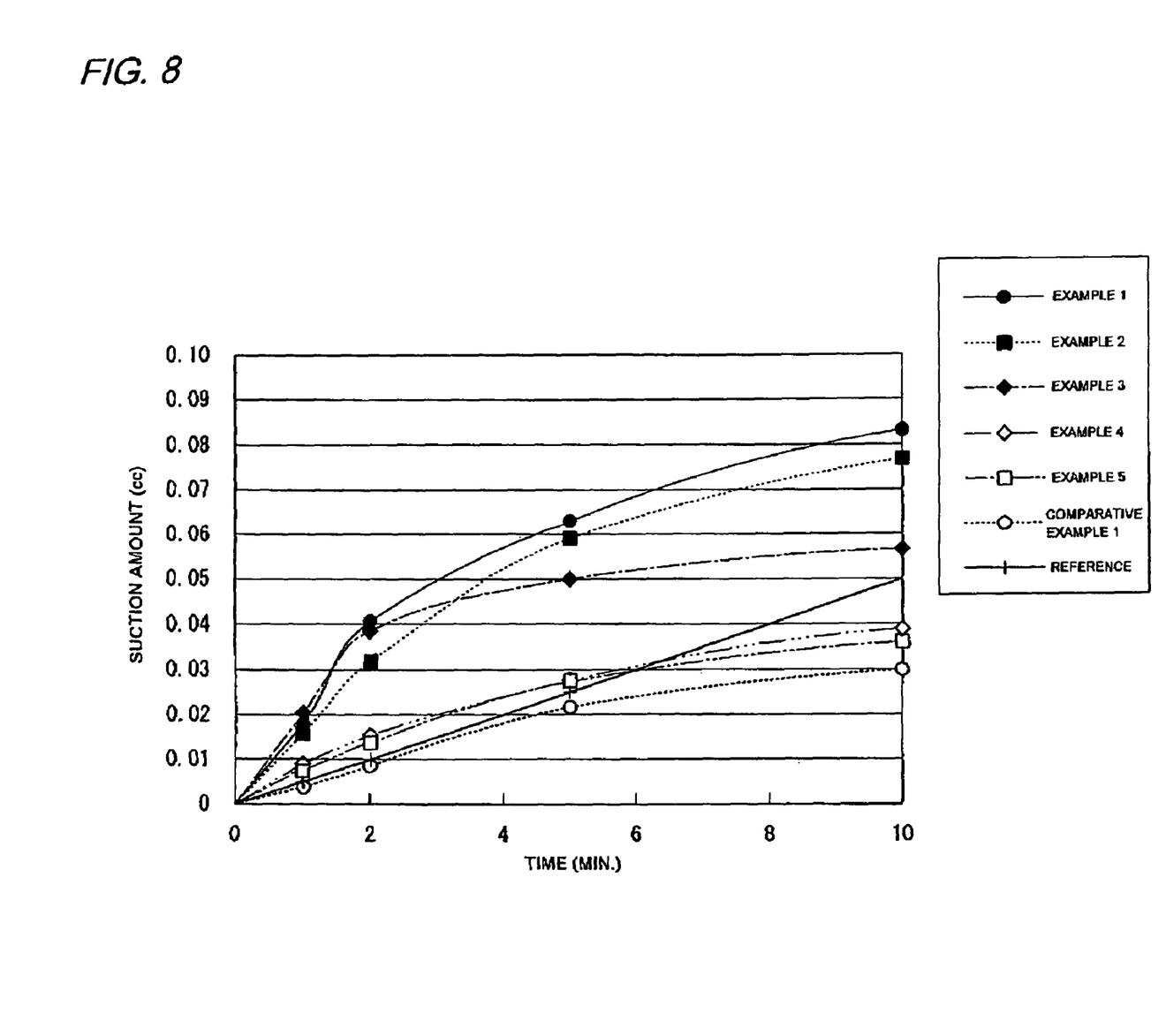
FIG. 8 is a diagram showing results of a suction test of wick members.

There were prepared wick members of Examples 1 to 5 and Comparative Example 1 having respective cord diameters, fiber diameters, fiber densities and porosities shown in Table 2 below. Then, each of these wick members was kept in a generally-vertically standing condition in the above lubricating oil 2, and the amount of suction of the lubricating oil was measured four times thereafter, that is, 1 minute, 2 minutes, 5 minutes and 10 minutes later. Results thereof are shown in FIG. 8. In FIG. 8, the supply amount of 0.005 cc/min. obtained in the above seizure test is indicated as a reference (reference line). In each of the wick members of Examples 1 to 5 and Comparative Example 1, a bundle of PET-made fibers was covered with a binder (urethane).

TABLE 2

|  | Cord Diameter (mmφ) | Fiber Diameter Denier (mmφ) | Fiber Density (fibers/mm$^2$) | Porosity (%) |
|---|---|---|---|---|
| Example 1 | 2.1 | 5D (0.023) | 550 | 65.0 |
| Example 2 | 2.1 | 3D (0.014) | 860 | 65.5 |
| Example 3 | 2.3 | 20D (0.090) | 90 | 68.0 |
| Example 4 | 2.2 | 5D (0.023) | 780 | 46.0 |
| Example 5 | 2.2 | 3D (0.014) | 1270 | 45.5 |
| Comparative Example 1 | 2.1 | 2D (0.009) | 1930 | 42.5 |

It will be appreciated from FIG. 8 that the wick members of Examples 1 to 5 (Porosity: 45.5 to 68.0%) suck the lubricating oil in an amount exceeding the reference value (0.005 cc/min.) 5 minutes after the start of the test. Particularly, the wick members of Examples 1 to 3 (Porosity: 65.0 to 68.0%) can suck the lubricating oil in an amount exceeding the reference value (0.005 cc/min.) even 10 minutes after the start of the test, and thus it has been found that these wick members can supply the lubricating oil in a more stable manner.

What is claimed is:

1. A turbocharger comprising:
a housing including a cooling water jacket provided therein, and
a turbine shaft supported in a center hole in a center portion of the housing through a rolling bearing, a turbine being mounted on one end portion of said turbine shaft and disposed exteriorly of the housing in an axial direction;
a tank portion which is disposed in said housing, and stores lubricating oil for said rolling bearing; and
a wick member for supplying the lubricating oil from said tank portion to said rolling bearing by a capillary action,
wherein a distal end portion of said wick member is held in contact with said rolling bearing such that said distal end portion branches into a plurality of sections
wherein a distal end portion of said wick member is held in contact with said rolling bearing such that said distal end portion branches into a plurality of sections,
wherein a section of the plurality of sections contacts a portion of the rolling bearing and an other section of the plurality of sections contacts another portion of the rolling bearing.

2. A turbocharger according to claim 1, wherein said wick member comprises a bundle of fibers comprising a plastic material, and the distal end portion of said wick member is separated into a fibrous condition.

3. A turbocharger according to claim 1, wherein said wick member includes a core portion, and said core portion includes a fiber portion composed of a large number of fibers comprising a plastic material, and interstices existing between said fibers, and
wherein a porosity of said core portion which is the ratio of said interstices to a total volume of said core portion is in the range of from 45.5% to less than 80%.

4. A turbocharger according to claim 3, wherein said porosity is in the range of from 65% to less than 80%.

5. A turbocharger according to claim 1, wherein said wick member includes a core portion and a sheath portion, and wherein said core portion includes a fiber portion comprising a plurality of fibers.

6. A turbocharger according to claim 5, wherein the plurality of fibers have a fiber diameter of 3 denier to 20 denier.

7. A turbocharger according to claim 6, wherein the plurality of fibers have a fiber density of 90 fibers/mm$^2$ to 1,270 fibers/mm$^2$.

8. A turbocharger according to claim 1, wherein the distal end portion is bifurcated to form two sections.

9. A turbocharger according to claim 1, wherein the wick, member comprises a plurality of plastic fibers.

10. A turbocharger according to claim 1, wherein the wick member comprises a plurality of wick members.

11. A turbocharger according to claim 1, wherein the section of the plurality of sections is disposed on a portion of the rolling bearing which extends in a radial direction and the other section of the plurality of sections is disposed on an other portion of the rolling bearing which extends in an axial direction.

12. A turbocharger according to claim 1, wherein the plurality of sections are disposed so as to be separated from each other.

13. A turbocharger according to claim 1, wherein distal ends of the plurality of sections are disposed so as to be separated from each other.

14. A turbocharger according to claim 1, wherein said rolling bearing includes an inner ring comprising a first raceway formed at an outer periphery thereof, an outer ring comprising a second raceway formed at an inner periphery thereof; and at least one intermediate ring which is interposed between said inner and outer rings, and includes a third raceway formed at an inner periphery thereof and also includes a fourth raceway formed at an outer periphery thereof, a row of rolling elements rollably interposed between said third raceway of said intermediate ring and said first raceway of said inner ring, and a row of rolling elements rollably interposed between said fourth raceway of said intermediate ring and said second raceway of said outer ring, and
wherein said intermediate ring includes a larger-diameter ring portion, a smaller-diameter ring portion, and an inclined ring portion interconnecting said larger-diameter and smaller-diameter ring portions and disposed in inclined relation to said axial direction, and a distal end portion of said wick member contacting said rolling bearing is bifurcated to form two sections, and one of said two sections is held in contact with an inner peripheral surface of said smaller-diameter ring portion, while the other of said two sections is held in contact with an end face of said smaller-diameter ring portion.

15. A turbocharger comprising:
a housing including a cooling water jacket provided therein, and
a turbine shaft supported in a center hole in a center portion of the housing through as rolling bearing, a turbine being mounted on one end portion of said turbine shaft and disposed exteriorly of the housing in an axial direction;
a tank portion which is formed in said housing, and stores lubrication oil for said rolling bearing; and
a wick member for supplying the lubricating oil from said tank portion to said rolling bearing by a capillary action, and a distal end portion of said wick member is held in contact with said rolling bearing such that said distal end portion is separated into a plurality of sections,
wherein said rolling bearing includes an inner ring having comprising a first raceway formed at an outer periphery thereof, an outer ring comprising a second raceway formed at an inner periphery thereof, and at least one intermediate ring which is interposed between said inner and outer rings, and includes a third raceway formed at an inner periphery thereof and also includes a fourth raceway formed at an outer periphery thereof, a row of rolling elements rollably interposed between said third raceway of said intermediate ring and said first raceway of said inner ring, and a row of rolling elements reliably interposed between said fourth raceway of said intermediate ring and said second raceway of said outer ring, and said intermediate ring includes a larger-diameter ring portion, a smaller-diameter ring portion, and an inclined ring portion interconnecting said larger-diameter and smaller-diameter ring portions and disposed in inclined relation to said axial direction, and the distal end portion of said wick member disposed close to said rolling bearing is bifurcated to form two sections, and one of said two sections is held in contact with an inner peripheral surface of said smaller-diameter ring portion, while the other of said two sections is held in contact with an end face of said smaller-diameter ring portion.

* * * * *